Figure 1:
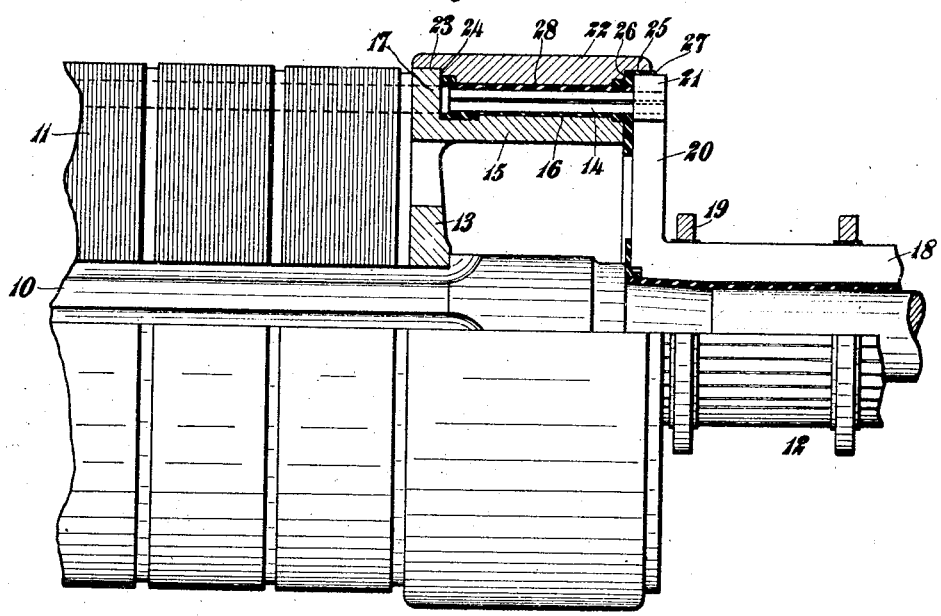

No. 858,246. PATENTED JUNE 25, 1907.
E. C. WRIGHT.
DIRECT CURRENT DYNAMO ELECTRIC MACHINE.
APPLICATION FILED NOV. 30, 1906.

Witnesses
Oliver W. Sharman
Fred J. Kinsey

Inventor
Edwin C. Wright
By Chas. E. Lord
Attorney

UNITED STATES PATENT OFFICE.

EDWIN C. WRIGHT, OF NEWPORT, KENTUCKY, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

DIRECT-CURRENT DYNAMO-ELECTRIC MACHINE.

No. 858,246. Specification of Letters Patent. Patented June 25, 1907.

Application filed November 30, 1906. Serial No. 345,600.

*To all whom it may concern:*

Be it known that I, EDWIN C. WRIGHT, a citizen of the United States, residing at Newport, in the county of Campbell and State of Kentucky, have invented certain new and useful Improvements in Direct-Current Dynamo-Electric Machines, of which the following is a full, clear, and exact specification.

My invention relates to dynamo-electric machines, and particularly to high speed machines of the direct current type such as direct current turbo-generators.

In a high speed machine, it is necessary to provide means for holding in position the portions of the coils which project beyond the ends of the core, so that the coils can not be displaced by centrifugal action. It has been proposed to surround the coils by heavy rings or bands made from some material such as phosphor bronze. When rings are employed for this purpose, it is necessary to provide some means for supporting, centering and retaining them in position.

In direct current machines, considerable difficulty has been experienced in providing adequate supporting and protecting means for the coils at the commutator end of the armature for the reason that the commutator necks or leads connecting the coils to the commutator bars render difficult proper supporting of coil retaining rings. Accordingly band wires have usually been relied upon for retaining the projecting portions of the coils in position. This latter expedient is not satisfactory for all types of machines particularly large high speed machines, for the reason that at high peripheral speeds, the band wires are in danger of breaking or becoming loose and wrecking the machine.

The object of my invention is to provide improved means for supporting, centering, and retaining in position a ring for the projecting portions of the coils at the commutator end of the machine.

In carrying out my invention I arrange the commutator leads so that they accomplish this result.

Considering my invention more specifically, I provide rigid commutator leads or necks integral with the commutator bars, which leads project a short distance beyond the ends of the coils into a groove or recessed portion of the ring which is thus so firmly supported that a movement or displacement is impossible.

My invention further consists in certain novel details of construction and combinations of elements described in the specification and set forth in the appended claims.

Figure 2:
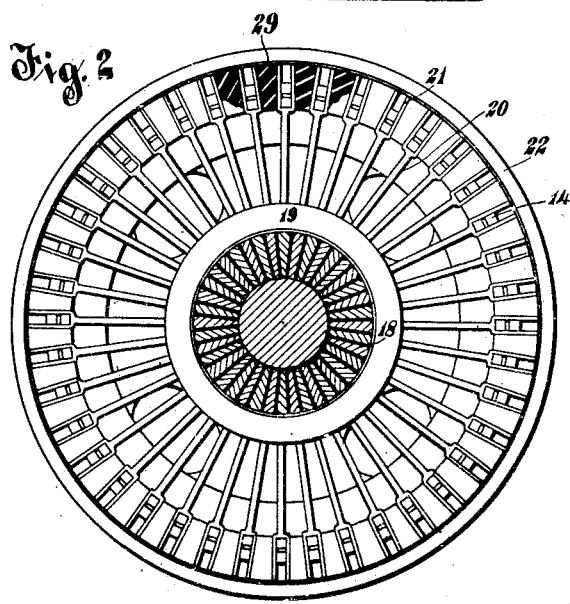

For a better understanding of my invention, reference is had to the accompanying drawings in which Figure 1 is a partial longitudinal sectional elevation of the rotary member of a high speed direct current machine equipped with my invention; and Fig. 2 is an end view of the same, the shaft being shown in section.

Referring now to the figures of the drawing, I have shown at 10 a shaft on which the armature 11 and commutator 12 are mounted. The armature core consists of laminæ clamped between end members one of which is shown at 13. The armature is provided with a winding having portions 14 which project beyond the core and rest upon the shoulder or bracket 15 extending outwardly from the end member 13, the coils being separated from the bracket by suitable insulation 16. The end member 13 is also provided with a flange 17 which in this case is substantially flush with the outer periphery of the core. This flange is provided with openings, preferably open slots, through which the projecting portions of the winding pass.

The bars 18 of the commutator are supported upon the shaft and are clamped together in this instance by a plurality of shrink rings 19, two of which are shown. The bars 18 are connected to the ends of the coils of the armature winding which project a short distance beyond the shoulder or bracket 15 of the end-member, by commutator leads or necks 20. In this case these leads or necks are integral with the bars 18, and are heavier and more rigid than in the usual construction of dynamo-electric machines. The commutator leads or necks are provided at their outer ends with cup or U-shaped portions 21 in which the ends of the conductors of the armature winding are located and soldered. As is clearly shown the ends of the commutator leads or necks extend outward beyond the conductors of the armature winding.

At 22 is shown a protecting ring for the portions of the coils which project beyond the core and end-member 13. As is shown, this ring is provided at its inner end with a grooved or recessed portion 23 and shoulder 24, and at its outer end with a grooved or recessed portion 25 and shoulder 26. The inner end of the ring rests on the flange 17 of the end-member with the shoulder 24 bearing against the side of the flange, the outer end of the ring rests on the outer ends 21 of the commutator leads or necks, and the intermediate portion rests upon the coils, suitable insulation 27 being interposed between the ends of the commutator leads and the ring, and insulation 28 being interposed between the coils and the ring.

In assembling the parts, the projecting portions 14 of the coils are first covered with insulation 28, and the ring is then slipped into the position shown with the shoulder 24 bearing against the flange. The insulation 27 is then placed in the grooved or recessed portion 25 of the ring, after which the commutator is slipped onto the shaft and forced into position with the ends of the commutator leads or necks located in the grooved or recessed portion 25 of the ring. The coils and commutator leads are then soldered together. The insulation 27 is preferably made of such material as will not be injured by the soldering of the coils and commutator necks. The parts are so machined that the ring fits tightly over the flange, coils and commutator leads or necks. It is seen that the commutator leads or necks support and center the outer end of the ring and prevent longitudinal movement of the ring. The outer ends of the commutator leads are preferably spaced apart and braced. In this case this is accomplished by blocks or projections 29 of insulation which may be integral with the insulation 27.

I have in this case shown commutator leads or necks integral with the commutator bars. In some instances however the commutator leads or necks may be separate members riveted or otherwise secured to the bars. Also if desired, the portion of the end ring overhanging the commutator leads may be omitted, in which case the commutator leads, would serve to prevent axial movement of the ring, the latter being centered and supported on the coils and end-member 13.

I do not wish to be confined to the exact details shown but I aim in my claims to cover all modifications which come within the spirit and scope of my invention.

What I claim as new and desire to secure by Letters Patent is:—

1. In combination, an armature, a core, coils carried by said core and projecting beyond the end thereof, a ring surrounding the projecting portions of the coils, a commutator, and commutator leads or necks connecting the coils and commutator bars, said leads or necks serving to retain the ring in position.

2. In combination, an armature, a core, coils carried by said core and projecting beyond the end thereof, a ring surrounding the projecting portions of the coils, a commutator, and commutator leads or necks connecting the coils and commutator bars, said ring being supported and retained in position by said commutator leads.

3. In combination, an armature, a core, coils carried by said core and projecting beyond the end thereof, a ring surrounding the projecting portions of the coils, a commutator, and commutator leads or necks connecting the coils and commutator bars, said commutator leads extending outward beyond the ends of the coils and serving to support and retain the ring in position.

4. In combination, an armature of a dynamo-electric machine, comprising a core, coils projecting beyond the core, and a ring surrounding the projecting portions of the coils and commutator, and commutator leads or necks integral with the commutator bars, said leads or necks serving to retain the ring in position.

5. In combination, an armature core, coils carried by the core and projecting beyond the end thereof, a ring surrounding the projecting portions of the coils, said ring having a grooved or recessed portion adjacent the outer ends of the coils, and rigid commutator leads or necks integral with the commutator bars, the ends of said commutator leads or necks being located within the grooved or recessed portion of the ring so as to support and retain the ring in position.

In testimony whereof I affix my signature, in the presence of two witnesses.

EDWIN C. WRIGHT.

Witnesses:
GEO. B. SCHLEY,
FRED J. KINSEY.